United States Patent
Hilgenkamp

(10) Patent No.: US 8,918,859 B2
(45) Date of Patent: Dec. 23, 2014

(54) PROCESS FOR ESTABLISHING A VPN CONNECTION BETWEEN TWO NETWORKS

(75) Inventor: Ingo Hilgenkamp, Rietberg (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 432 days.

(21) Appl. No.: 13/272,583

(22) Filed: Oct. 13, 2011

(65) Prior Publication Data

US 2012/0096540 A1  Apr. 19, 2012

(30) Foreign Application Priority Data

Oct. 15, 2010  (DE) .......... 10 2010 038 228

(51) Int. Cl.
G06F 15/10 (2006.01)
H04L 29/06 (2006.01)
H04L 12/46 (2006.01)
H04L 12/24 (2006.01)

(52) U.S. Cl.
CPC ............ H04L 63/20 (2013.01); H04L 12/4641 (2013.01); H04L 63/0272 (2013.01); H04L 41/0806 (2013.01)
USPC .......................................................... 726/15

(58) Field of Classification Search
None
See application file for complete search history.

(56) References Cited

U.S. PATENT DOCUMENTS

| | | | |
|---|---|---|---|
| 3,881,606 A | 5/1975 | Swinehart | |
| 2002/0053031 A1* | 5/2002 | Bendinelli et al. | 713/201 |
| 2002/0124090 A1* | 9/2002 | Poier et al. | 709/228 |
| 2003/0041136 A1* | 2/2003 | Cheline et al. | 709/223 |
| 2004/0088542 A1 | 5/2004 | Daude et al. | |
| 2006/0037072 A1 | 2/2006 | Rao et al. | |
| 2007/0150946 A1 | 6/2007 | Hanberger et al. | |
| 2007/0198823 A1* | 8/2007 | Blew et al. | 713/150 |
| 2010/0313259 A1* | 12/2010 | Fries et al. | 726/10 |

FOREIGN PATENT DOCUMENTS

| | | |
|---|---|---|
| DE | 92354 A | 10/1971 |
| DE | 33 16 310 A1 | 12/1983 |
| WO | WO 0217558 A2 * | 2/2002 |

* cited by examiner

Primary Examiner — Matthew Henning
(74) Attorney, Agent, or Firm — Nath, Goldberg & Meyer; Jerald L. Meyer; Katelyn J. Bernier

(57) ABSTRACT

A VPN connection is established between two networks (1, 6), with two communication devices (2, 7) assigned to the given networks (1, 6), a transmission device (11), and an identifying means. An initial VPN data package is transmitted from the first communication device (2) to the transmission device (11). The second communication device is identified (7) to the transmission device (11) through use of the identifying means. A second VPN data package is transmitted from the second communicating device (7) to the transmission device (11). The transmission device (11) provides an initial VPN configuration parameter (12) for establishing the VPN connection between the communication devices (2, 7) for the first communication device (2), and the transmission device (11) provides a second VPN configuration parameter (13) for establishing the VPN connection between the communication devices (2, 7) for the second communication device (7).

6 Claims, 2 Drawing Sheets

PROCESS FOR ESTABLISHING A VPN CONNECTION BETWEEN TWO NETWORKS

Figure 1:
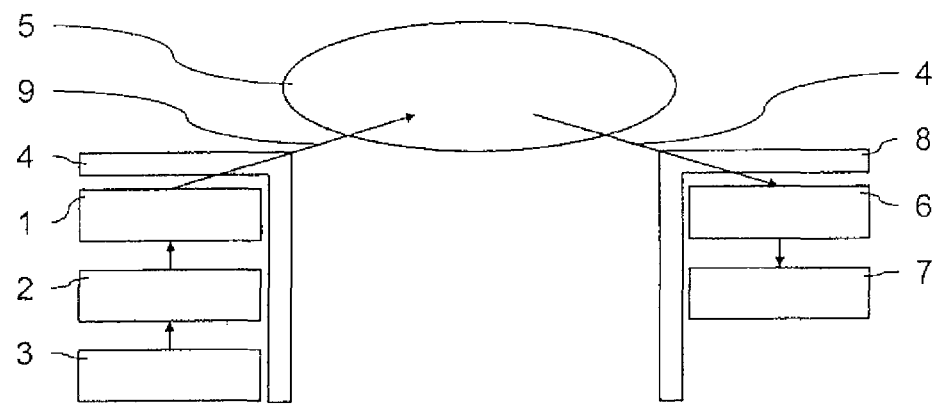

The invention relates to a process for establishing a VPN connection between two networks, having two communication devices assigned to the given networks, a transmission device, and an identifying means.

VPN networks of the type under discussion are well-known in the prior art and are typically used to link users of a network from their original network to another network in such a way that it seems to the user of the original network that he is not connected to the original network, but is directly connected to the other network. VPN networks are of great significance in different areas of industry, such as remote plant maintenance, and in many ways provide a substantial savings in resources for plant maintenance. To be sure, providing the individual configuration which is needed for the creation of such a VPN connection, and which is often designed specifically for an individual customer, demands a high knowledge of IT and automation, along with the knowledge of a number of different parameters, specifically those which are requested by the networks of the corresponding communication devices (e.g., servers) or which depend on the safety standards of the plant operator or the remote maintenance provider. To this extent, it is disadvantageous that existing systems for creating a VPN connection are very expensive, e.g., for the remote maintenance of a plant.

The goal of the invention, therefore, is to provide a process for establishing a VPN connection, by means of which process the VPN connection can be established in a particularly easy and secure manner between two networks.

This goal is achieved with the subject matter of the independent claims. Preferred elaborations are described in the secondary claims.

A solution for the indicated goal thus consists in a process for establishing a VPN connection between networks, with two communication devices assigned to the given networks, as well as a transmission device, and an identifying means. The process involves the following steps:

b) identifying the first communication device to the transmission device using the identifying means, c) transmitting an initial VPN data package from the first communication device to the transmission device, e) identifying the second communication device to the transmission device using the identifying means, f) transmitting a second VPN data package from the second communicating device to the transmission device l) provision by the transmission device of an initial VPN configuration parameter for establishing the VPN connection between the communication devices for the first communication device, and m) provision by the transmission device of a second VPN configuration parameter for establishing the VPN connection between the communication devices for the second communication device.

Thus the invention provides that the transmission device makes the first VPN configuration parameter available to the first communication device and the second VPN configuration parameter available to the second communication device, with the result that said communication devices can establish the VPN connection in a particularly simple manner using the configuration parameters thus provided. The process according to the invention thus makes it possible to create a VPN connection between the communication devices without the user having to possess specialized IT knowledge, e.g., of VPN connections, or other knowledge of networks. In an advantageous manner, the first VPN configuration parameter and/or the second configuration parameter include information on the networks, protocols, gateway IP addresses, and ports assigned to the given communication devices, as well as other information known from the prior art and needed to establish a VPN connection. Here the VPN data packets can contain return and destination addresses corresponding to, or deviating from, the given communication device and/or transmission device.

The communication devices take the form of devices for creating a VPN connection that are known to the prior art, e.g., a router, firewall, and/or server. Likewise, the transmission device is designed as a device in a network for the transmission of services, as known to the prior art, e.g., a server. The networks preferably take the form of IP networks, and the VPN connection can be advantageously designed according to a protocol such as IPsec, TLS/SSL, ViPNet, PPTP and L2TP, PPPD and SSH, and/or SSTP. Furthermore, the transmission device and the networks assigned to the given communications devices are connected to each other by another network, such as the internet.

The invention provides that the communication devices identify themselves to the transmission device in succession with the same identifying means and that a VPN data packet is then sent in each case to the transmission device. It is furthermore provided that the specific VPN configuration parameters for creating a VPN connection between the communication devices are extracted from the received VPN data packet by the transmission device and that the VPN configuration parameters thus obtained are made available to the specific communication devices for the subsequent creation of the VPN connection. In this way, a VPN connection, advantageously a secure VPN connection, can be established between the two networks assigned to the communication devices.

It is also preferred that the first communication device is connected to a plant and/or a apparatus by way the first network, which is assigned to said first communication device, and that the second communication device is connected to a second network, which is assigned to said second communication device and which belongs to the maintenance provider, e.g., that of the plant manufacturer. In this way, the maintenance provider can perform remote maintenance of the plant or apparatus by means of the VPN connection thus established.

It is particularly preferred if step b) can be performed by a user in such a way that the first communication device is identified to the transmission device by accessing a website assigned to the transmission device. Here the identifying means can take the form of, e.g., a login, token, and/or password for the website.

The process according to the invention provides for a step k): determination by the transmission device of the first VPN configuration parameter and the second VPN configuration parameter from the received initial VPN data packet and/or the received second VPN data packet. According to this particularly preferred embodiment of the invention, the information required to establish the VPN connection between the communication devices is first extracted from the VPN data packets sent by the given communication devices to the transmission device. In a further step, the information is then made available to the given communication devices in the form of VPN configuration parameters, preferably by steps l) and/or m). In a further elaboration of the invention it may be advantageous if a plurality of initial data packets and/or second data packets are first received, until all necessary information for determining the first VPN configuration parameters and the second VPN configuration parameters is identified from the received first VPN data packets and/or the received second VPN data packets.

In contrast to the prior art, where the VPN configuration parameters had to be issued manually and, almost without exception, through reliance on specialized expertise, the invention thus advantageously allows the VPN configuration parameters to be generated from the VPN data packets in a particularly simple manner, one which is almost fully automated. This makes it possible to establish a VPN connection between two networks in a particularly easy manner.

According to another preferred embodiment, the process includes steps: a) producing a connection between the first communication device and the transmission device, and d) producing a connection between the second communication device and the transmission device. Here the production of a connection between the communication device and the transmission device may occur, e.g., by having the user associated with the given communication device access a website assigned to the transmission device. In alternative fashion, a connection between the communication device and the transmission device can be produced automatically by the communication device, e.g., upon request of the user. It is particularly preferred if step d) is performed one hour after step a) or, by further preference, 30 minutes thereafter or, by particular preference, 5 minutes thereafter. With embodiments like these, the establishment of the VPN connection can be initialized in a particularly simple manner.

In principle, step l) may immediately follow step f), as described above. According to another preferred embodiment of the invention, however, it is provided that the process includes these steps: h) sending a VPN data packet from the transmission device to the first communication device and/or the second communication device, and i) testing to determine whether the first communication device or, as the case may be, the second communication device has received the VPN data packet. In this manner, it is possible, e.g., to test whether the communication device is equipped to receive a VPN data packet, in addition to sending a VPN data packet as per step c) or f). It this way, it can also be tested to determine whether a firewall, which, e.g., protects the network associated with the communication device from unauthorized access, is configured in such a way that not only a VPN connection can be established in outgoing fashion through sending a VPN packet (as provided in step c) or step f)), but also whether the firewall is configured in such a way that incoming VPN connections, e.g., the reception of a VPN data packet in accordance with step h), can be established. A configuration of this kind thus allows a test or simulation to be performed in a simple manner in order to determine whether the communication device can not only transmit VPN data packets, but also receive them.

In this connection, another preferred embodiment of the invention specifies that the process includes steps: g) notifying the first communication device or, as the case may be, the second communication device via the transmission device through execution of the next step h); and j) issuing an error message if the first communication device (or the second communication device) has not received the VPN data packet. With these steps, therefore, it is provided that the communication device is first informed that a VPN data packet is being sent to the communication device by the transmission device, and that an error message is issued if the VPN data packet has not reached the communication device. Such an error message advantageously includes information on networks, protocols, gateway IP addresses, and ports, as well as other parameters for establishing a VPN connection, as known to the prior art. Configured in this way, problems that arise in establishing the VPN connection can be tested for in an especially simple way and, through the issuing of an error message, identified and localized.

According to another preferred embodiment of the invention, step c) and/or step f) are performed after the transmission device has made a request to the first communication device or, as the case may be, the second communication device. In this embodiment it is advantageously specified that the VPN data packet is only sent to the transmission device when this action has been requested by the transmission device, e.g., after provisions have been made for the VPN data packet to be received.

In a highly preferred embodiment the process contains step: n) establishing the VPN connection between the communication devices by means of the first communication device and/or the second communication device. In accordance with this embodiment, it is thus preferred that the communication devices use the VPN configuration parameters provided by the transmission device in steps l) and/or m) to establish the VPN connection between the communications devices. This means that the VPN connection between the communication devices is then established without further interaction of the transmission device, so that, e.g., a plant can be remotely maintained via the VPN connection.

In principle, the specialist can design the step for "identification using the identifying means" in any way desired. According to a preferred embodiment of the invention, however, it is provided that the indicated step (identification using the identifying means) includes logging onto a website associated with the transmission device and that the identifying means takes the form of a log-in account belonging to the website. For example, the identifying means can be a temporary log-in account which is issued by the first communication device in step b), while in step e) the second communication device then uses the same log-in account for the purpose of identification. Such a design thus ensures a particularly simple operation or implementation of the inventive process for establishing a VPN connection between two networks.

A solution for the problem addressed by the invention also involves the use of the indicated process for the remote maintenance of a plant, such that the first communication device is connected to the plant over a network. Using the process according to the invention in this way permits a plant, e.g., an industrial plant, to be remotely maintained in a particularly simple way, without the need for specialized knowledge of VPN protocols on the part of the user when the VPN connection required for remote maintenance is established.

Further elaborations and benefits of the process according to the invention will become apparent to the specialist through analogy with the process as already described.

A solution for the above indicated problem also occurs by means of a transmission device for implementation of the invention process. The transmission device can advantageously take the form of a server.

Further elaborations and benefits of the transmission device according to the invention will become apparent to the specialist through analogy with the process as already described.

The invention will next be described in greater detail on the basis of the drawing, which depicts a preferred embodiment.

Figure 2:
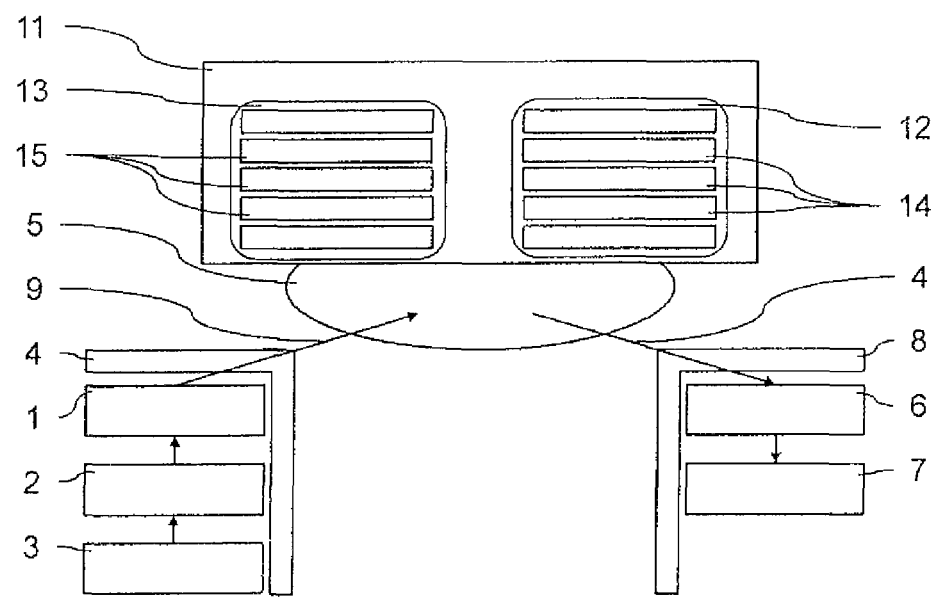
Figure 3:
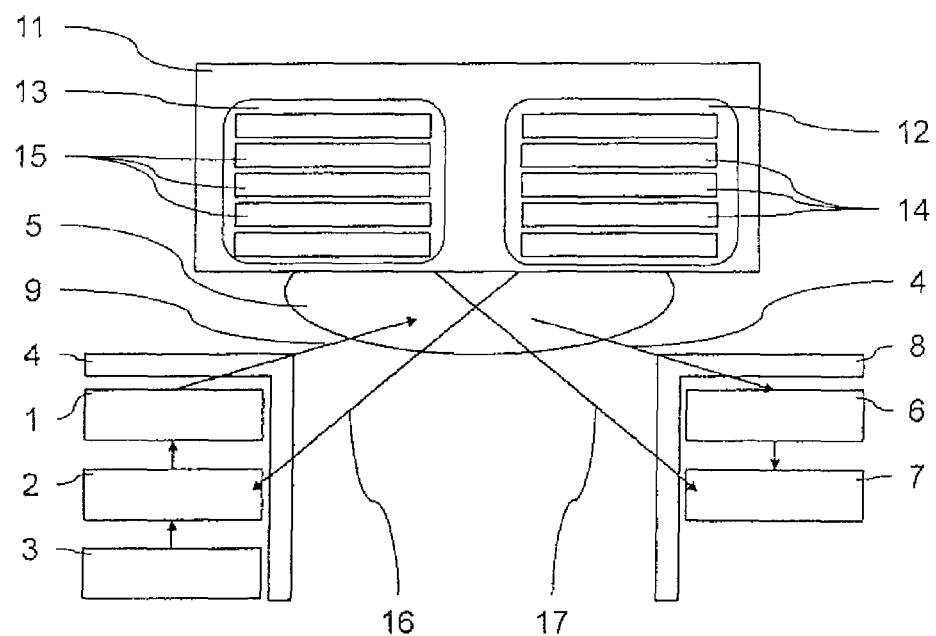

Shown are:

FIG. 1 a schematic overview of a remotely maintained environment, as known to the prior art FIG. 2 a schematic overview of the remotely maintained environment, with the transmission device according to a preferred embodiment of the invention FIG. 3 a schematic overview of the remotely maintained environment, with the transmission device according to the preferred embodiment of the invention, in another view FIG. 1 shows a remote maintenance environment as known to the prior art, containing a network 1 which is located at a plant operating company and which is connected to a plant 3 belonging to the operating company via an initial communication device 2. The first network 1, as well as the first communication device 2 and the plant 3, are connected to the internet by way of a firewall 4.

Also evident in FIG. 1 is a second network, which is located with a remote maintenance contractor and which contains a second communication device 7 connected to the internet 5 in protected fashion by a firewall 8.

The first network 1, the second network 6, and the internet 5 operate with the IP protocol known to the prior art. Likewise, firewalls 4, 8 are designed in accordance with the prior art and thus provide protection against unauthorized access from the internet 5. However, these firewalls 4, 8 are configured for outgoing VPN connections 9 or incoming VPN connections 10 in such a way that said connections 9, 10 are allowed by the firewalls 4, 8. Furthermore, the plant 3 may take the form of any industrial plant known to the prior art. The first communication device 2 and the second communication device 7 are each designed as VPN routers for establishing a VPN connection between the communication devices 2, 7.

In the process according to the invention, the first step a) produces a connection between the first communication device 2 and a transmission device 11, which here takes the form of a server, such that said transmission device 11 is also connected to the internet 5.

Step b) identifies the first communication device 2 to the transmission device 11 using an identifying means. This occurs through logging into the webpage of the transmission device 11 in such a way that the first communication device 2 creates a temporary log-in account on the webpage as the identifying means. Here both step a) and step b) can be initiated by the user of the plant 3.

In a following step c) the first communication device 2 sends an initial data packet to the transmission device 11, and the transmission device 11 receives the VPN data packet transmitted by the first communication device 2.

In step d) a connection is next established between the second communication device 6 and the transmission device 11, also, by accessing the webpage associated with the transmission device 11.

In the next step e) the second communication device 6 identifies itself to the transmission device 11 with the same identifying means, i.e., with the same temporary log-in account, and in step f) sends a second VPN data packet from the second communication device 6 to the transmission device 11. The transmission device 11 then receives the second VPN data packet from the second communication device 6.

In step k) the transmission device 11 determines an initial VPN configuration parameter 12 and a second VPN configuration parameter 13 from the received VPN data packet. The VPN configuration parameters 12, 13 contain information 14, 15 such as networks, protocols, gateway IP addresses and/or ports, and other parameters known to the prior art for establishing a VPN connection, and these parameters are extracted from the received VPN data packets by the transmission device 11. Here the VPN configuration parameters 12, 13 are designed so that, once the VPN configurations 12, 13 are provided 16, 17 to the given communication devices 2, 7 by the transmission device 11 in accordance with steps l) and m), the communication device 2, 7 can directly establish a VPN connection by means of the received VPN configuration parameters 12, 13, as per step n).

In testing or simulating the VPN configuration parameters 12, 13, VPN data packets can be sent from the transmission device 11 to the communication devices 2, 7, as specified in step h).

In a subsequent step i) a test is then performed to determine if the VPN data packet has reached the first communication device 2 or, as they case may be, the second communication device 7.

Through issuing an error message, for example, "incoming UDP packets are blocked at port 500", as specified in step j), it can be identified whether, e.g., the firewall 4, 8 prevents an incoming connection 10, thereby allowing the user to configure the configuration of the fire wall 4, 8 for the outgoing connections 9 and incoming connections 10 which are necessary to establish the VPN connections. To this end, it is advantageous that, before the test transmission of the VPN data packet, the transmission device 11 notified the corresponding communication device 2, 7, in keeping with step g). The invention thus makes it possible to easily diagnose and localize an error in establishing the VPN connection.

Upon breakdown of an already established VPN connection, the described process for establishing the VPN connection can be repeated in a simple manner.

LIST OF REFERENCE NUMERALS

1 first network
2 first communication device
3 plant
4 firewall
5 internet
6 second network
7 second communication device
8 firewall
9 outgoing connection
10 incoming connection
11 transmission device
12 first VPN configuration parameter
13 second VPN configuration parameter
14 information
15 information
16 provision of the first VPN configuration parameter
17 provision of the second VPN configuration parameter

The invention claimed is:

1. A process for establishing a VPN connection between two networks, with two communication devices assigned to the given networks, a transmission device, and an identifying means, comprising the following steps:
   b) identifying the first communication device to the transmission device through use of the identifying means comprising a log-in on a webpage of the transmission device, whereby the identifying means takes the form of a temporary log-in account for the webpage, which is generated in this step,
   c) transmitting an initial VPN data package from the first communication device to the transmission device,
   e) identifying the second communication device to the transmission device by means of the identifying means comprising a log-in on the webpage of the transmission device, whereby the identifying means takes the form of the temporary log-in account for the webpage as generated in step b),
f) transmitting a second VPN data package from the second communicating device to the transmission device,
k) extracting by the transmission device of a first VPN configuration parameter and a second VPN configuration parameter from a received initial VPN data packet and/or from a received second VPN data packet,
l) provision by the transmission device of an initial VPN configuration parameter for establishing the VPN connection between the communication devices for the first communication device,
m) provision by the transmission device of a second VPN configuration parameter for establishing the VPN connection between the communication devices for the second communication device, and
n) establishment of the VPN connection between the communication devices by the first communication device and/or by the second communication device.

2. Process according to claim 1, further comprising:
a) establishing a connection between the first communication device and the transmission device, and
d) establishing a connection between the second communication device and the transmission device.

3. Process according to claim 1, further comprising:
h) sending a VPN data packet from the transmission device to the first communication device and/or the second communication device,
i) testing whether the first communication device or, as the case may be, the second communication device has received the VPN data packet.

4. Process according to claim 1, further comprising:
g) informing the first communication device or, as the case may be, the second communication device via the transmission device, and
j) issuing an error message if the first communication device or, as the case may be, the second communication device has not received a VPN data packet.

5. Process according to claim 1, wherein step c) and/or step f) are executed after a request is made by the transmission device to the first communication device or, as the case may be, the second communication device.

6. A method for remote maintenance of a plant according to the process of claim 1, and further comprising:
connecting the first communication device to the plant, and performing remote maintenance of the plant using the VPN-connection.

\* \* \* \* \*